US012722375B2

(12) United States Patent
Cuesta Saez et al.

(10) Patent No.: US 12,722,375 B2
(45) Date of Patent: Sep. 1, 2026

(54) PAGE WIDE ARRAY PRINT JOB INTERRUPTIONS

(71) Applicant: Hewlett-Packard Development Company, L.P., Spring, TX (US)

(72) Inventors: Blas Cuesta Saez, Sant Cugat del Valles (ES); Alvaro Lopez Antequera, Sant Cugat del Valles (ES); Albert Serra Monner, Sant Cugat del Valles (ES); Ferran Olivera Corpas, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 162 days.

(21) Appl. No.: 18/562,702

(22) PCT Filed: May 21, 2021

(86) PCT No.: PCT/US2021/033695
§ 371 (c)(1),
(2) Date: Nov. 20, 2023

(87) PCT Pub. No.: WO2022/245373
PCT Pub. Date: Nov. 24, 2022

(65) Prior Publication Data

US 2024/0239103 A1 Jul. 18, 2024

(51) Int. Cl.
*B41J 2/155* (2006.01)
*B41J 2/17* (2006.01)
(Continued)

(52) U.S. Cl.
CPC ............ *B41J 2/155* (2013.01); *B41J 2/1721* (2013.01); *B41J 11/001* (2013.01); *B41J 29/393* (2013.01); *B41J 2202/21* (2013.01)

(58) Field of Classification Search
CPC ........ B41J 29/393; B41J 2/155; B41J 2/2132; B41J 29/38; B41J 2/2146; B41J 2202/21;
(Continued)

(56) References Cited

U.S. PATENT DOCUMENTS

2006/0071954 A1 4/2006 Morooka et al.
2006/0120787 A1 6/2006 Abello
(Continued)

FOREIGN PATENT DOCUMENTS

EP 2571695 B1 8/2017
WO 2015/010747 A1 1/2015

*Primary Examiner* — Jannelle M Lebron
(74) *Attorney, Agent, or Firm* — Jordan IP Law, LLC

(57) ABSTRACT

Examples include a method comprising preparing nominal firing data of a print job for a first printhead die and for a second printhead die of a page wide array printer. The first printhead die is located downstream from the second printhead die along a media path of the printer, the printhead dies being offset along the media path by an offset distance. The methods comprises starting printing by applying the nominal firing data to the printhead dies; receiving a print job interruption request during printing of the print job; and in response to receiving the job interruption request, modifying the nominal firing data to obtain modified firing data for interrupting printing using the first printhead die while continuing printing using the second printhead die during a specific time period after the first printhead die interrupted the printing, the specific time corresponding to the offset distance.

15 Claims, 5 Drawing Sheets

(51) Int. Cl.
*B41J 11/00* (2006.01)
*B41J 29/393* (2006.01)

(58) Field of Classification Search
CPC ... B41J 2/2139; B41J 2202/20; G06K 15/102; G06K 15/408; G06K 15/1894; G06K 15/1852; G06K 15/1856
See application file for complete search history.

(56) References Cited

U.S. PATENT DOCUMENTS

2007/0211285 A1 9/2007 Shipton
2017/0225499 A1 8/2017 Quintero Ruiz et al.

PAGE WIDE ARRAY PRINT JOB INTERRUPTIONS

BACKGROUND

Printing takes place by operating printhead dies of a printer using digital data corresponding to graphical representations. The printhead dies eject or fire printing fluid on a media, the firing corresponding to the digital data, to obtain the graphical representation on the media. The digital data can be prepared to correspond to a specific printhead die configuration. In some cases, the printhead dies are arranged in a page wide array configuration, whereby the printhead dies span a page wide dimension of the media, such that a sheet of media following a media path may get printed without movement of the printhead dies relative to the printer.

DETAILED DESCRIPTION

Some page wide array printers operate by firing printing fluid from different printhead dies spanning a page wide dimension of a media path of such page wide array printer. A media on which printing fluid is fired by the printhead dies follows in some examples a one way media path direction, following the media path upstream to downstream. In some page wide array configurations, different printhead dies may be fixedly located at different locations upstream or downstream of the media path of the printer such that, when such different printhead dies fire printing fluid at a same instant, the printing fluid is fired on different respective areas by the differently located printhead dies, the firing area of a specific printhead die at that same instant being more upstream than another if such specific printhead die is more upstream than the other printhead die. When completing a print job, such positioning offset distance between printhead dies is taken into account whereby printhead dies located upstream may complete their firing sequence earlier than printhead dies located downstream. Similarly, when starting a print job, such positioning offset distance between printhead dies is taken into account whereby printhead dies located upstream start their firing sequence earlier than printhead dies located downstream. Such configuration and mode of operation however has the consequence that an unexpected interruption of a print job during printing would lead to obtaining an interrupted print ending in a discontinuous manner, for example in a crenelated manner in the case of staggered printhead dies. Such irregular discontinuous end of prints impacts a commercial value of such interrupted prints, in particular if the unplanned interruption takes place towards the end of a print job which could, in case of a clean interruption, have been commercially exploited. Such interruptions may be triggered by a variety of reasons, for example in case of reaching an end of media roll such that insufficient media is available to complete a print. In such a case, continuing printing without interruption could lead to ejecting printing fluid directly onto a printing platen or directly on a conveyor belt of a printer, leading to unnecessary soiling of such parts of the printer. Obtaining a clean end of print job in case of print job interruption forms the foundation of the present disclosure.

Figure 1A:
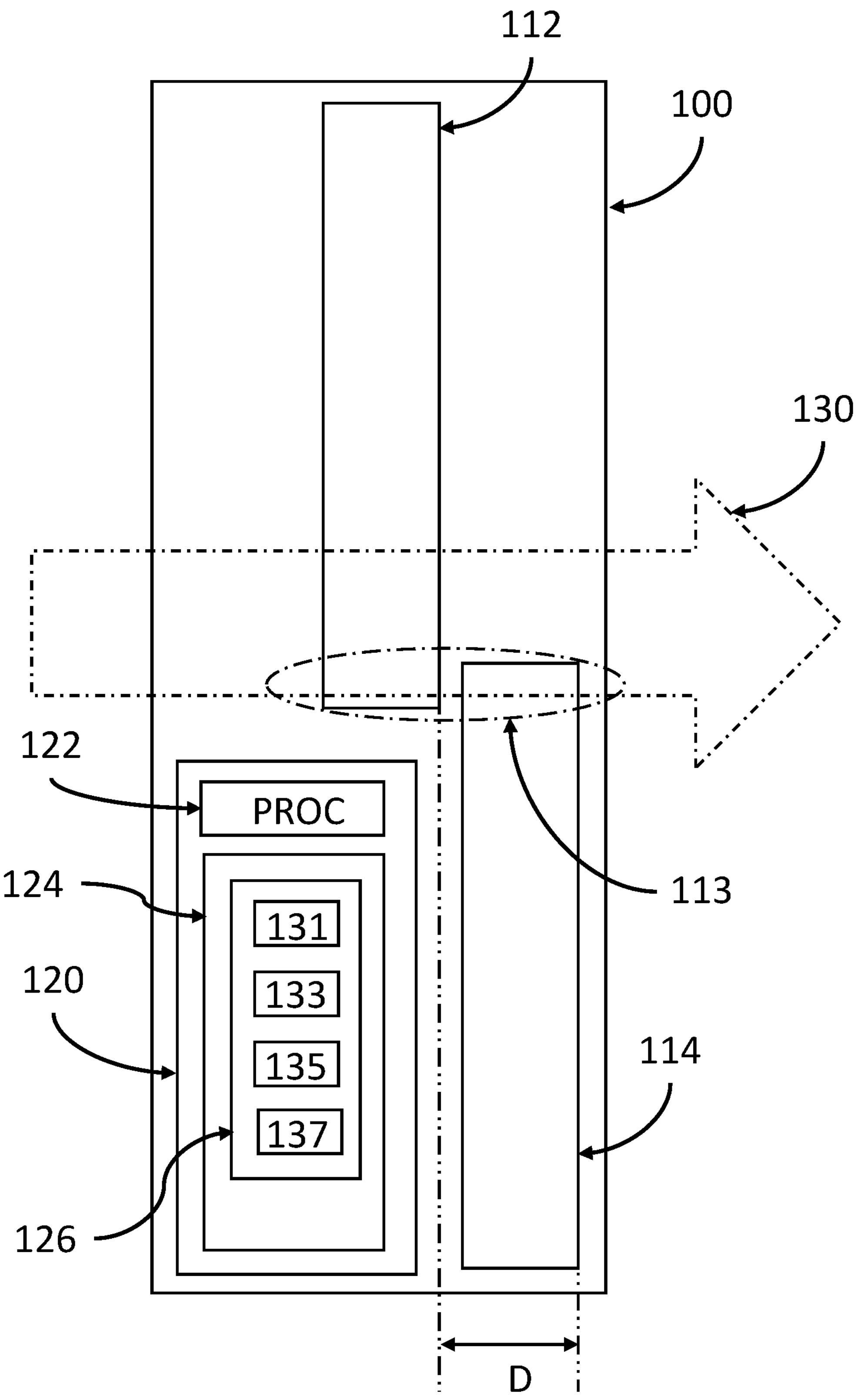
FIG. 1A illustrates an example printer.

FIG. 1A illustrates an example page wide array printer 100. A page wide array printer according to this disclosure should be understood as a printer to print simultaneously across a complete width of a printing area of a media sheet passing through the printer along a media path, such complete width being at a non zero angle to a media path direction, such complete width being for example along a direction perpendicular to the media path direction.

Example page wide array printer 100 comprises printhead dies 112 and 114. A printhead die should be understood according to this disclosure as a structure comprising printing fluid ejection nozzles. In some example, a printhead die is silicon based and comprises nozzles arranged along nozzle columns, or nozzle trenches. In some examples, printhead dies are piezo printhead dies or thermal inkjet printhead dies. Considering that a page wide array printer can print simultaneously across a complete width of a printing area of a media sheet, one may use a plurality of printhead dies to span such a complete width. In some examples, some printhead dies located adjacent to each other may have a zone of overlap across the width of the media sheet, in order to avoid or reduce a risk of uncomplete coverage of such width. In the specific example printer 100, two printhead dies are provided, such printhead dies sharing a narrow overlapping area 113.

In the example of printer 100, the printhead dies are offset along a media path 130 by an offset distance D. The media path should be understood in this disclosure as a path following a direction of movement of media as the media is processed by the printer for printing on the media. Movement of the media along the media path may take place using a combination of gravity, rollers, vacuum devices or belts, for example. A media path may be rectilinear or may follow a curve. The offset distance may in some examples be of at least a width of a printhead die along the direction of the media path, for example to permit introducing an overlapping area such as overlapping area 113 between adjacent printhead dies. The offset distance may in some examples be of less than twice a width of a printhead die along the direction of the media path, for example to avoid expanding a printing area or printing platen of a printer. The offset distance may be measured from comparable points of the printhead dies considered, for example between respective leading edges of the printhead dies, or between trailing edges of the printhead dies as represented on FIG. 1A. Trailing edge, leading edge, upstream and downstream should be understood in this disclosure as related to the direction followed by the media along the media path as illustrated by the head of arrow 130.

Example printer 100 comprises a controller 120. A controller according to this disclosure should be understood as a hardware device managing digital data in order to control a printing process. The controller 120 comprises a processor 122, a storage 124 coupled to the processor, and an instruction set 126. The processor may include a single-core processor, a multi-core processor, an application-specific integrated circuit (ASIC), a field programmable gate array (FPGA), and/or any other hardware device suitable for retrieval and execution of instructions from the storage or machine-readable medium 124 (e.g., instructions 131-137) to perform functions related to various examples. Additionally, or alternatively, the processor 122 may include electronic circuitry for performing the functionality described herein, including the functionality of instructions 131-137. The storage 124 may be any medium suitable for storing executable instructions, such as a random-access memory (RAM), electrically erasable programmable read-only memory (EEPROM), flash memory, hard disk drives, optical disks, and the like. In some example implementations, the storage is a machine-readable medium which may be a tangible, non-transitory medium, where the term "non-transitory" does not encompass transitory propagating signals. The storage 124 may be disposed within the processor-based controller 120, as shown in FIG. 1A, in which case the executable instructions may be deemed "installed" on the controller 120. Alternatively, the storage 124 may be a portable (e.g., external) storage medium, for example, that allows controller 120 to remotely execute the instructions or download the instructions from the storage medium. In this case, the executable instructions may be portion of an "installation package". As described further herein below, the storage 124 may be encoded with a set 126 of executable instructions 131-137.

The instruction set 126 is to cooperate with the processor and the storage to execute instruction 131 to load preliminary firing data for printing a complete print job. Firing data should in this disclosure be understood as digital data leading to emitting electrical control signals permitting to fire or eject printing fluid onto the media using the printhead dies. The loading may take place onto the storage 124. The firing data may correspond to digital data at one of different stages of a printing pipeline, upstream or downstream from such printing pipeline. The firing data may be one of digital data corresponding to a graphical representation to be printed, digital data following a rasterising process, digital data following a halftoning process, or digital data directly controlling electronic signals of piezo or resistor based ejecting chambers of nozzles of the printhead dies. The preliminary firing data is preliminary in that such data assumes that the print job will be completed without interruption and lead to a complete printed result of the print job, even if such print job may be interrupted. A print job should be understood in this disclosure as a data file comprising a graphical representation to be printed. Example print job data formats are PDF, EPS, JPG, TIFF, GIF, PNG or ZIP formats. Such print job data formats are processed to obtain the firing data according to this disclosure.

The instruction set 126 is to cooperate with the processor and the storage to execute instruction 133 to print a first portion of the complete print job by firing the printhead dies using the preliminary firing data. Such first portion of the complete print job gets printed following a process which would be followed to complete an uninterrupted print job. In some examples, the preliminary firing data comprises different firing data files respectively provided to different printhead dies. In some examples, the preliminary firing data is divided in different successive preliminary firing data files corresponding to different successive portions of the print job which are to be printed in succession over time, such different successive preliminary firing data files having for example a size adapted to data storage buffering capabilities of the controller.

The instruction set 126 is to cooperate with the processor and the storage to execute instruction 135 to load alternative firing data during the printing of the first portion; the alternative firing data corresponding to an interrupted version of the complete print job. An interruption should in this disclosure be understood as an event leading to interrupting printing of a complete print job, such that the actual, tangible printed version will miss a portion which would have been printed if the print job had been completed. In some examples, the first portion corresponds to at least 50%, at least 70%, at least 90% or at least 95% of the complete print job in printed surface area. It should be understood that in a case where a relatively high percentage of the complete print job is printed using the preliminary firing data, such print job is more likely to be commercially valuable when interrupted, leading to avoiding reprints which would otherwise consume additional consumable such as additional printing fluid and printing media. During printing of this first portion using the preliminary firing data, alternative firing data is loaded. Such alternative firing data is aimed at replacing the preliminary firing data, such replacement taking the interruption into account as will be explained further.

The instruction set 126 is to cooperate with the processor and the storage to execute instruction 137 to print a second portion of the complete print job by firing the printhead dies using the alternative firing data, whereby the preliminary firing data and the alternative firing data differ by a band of the complete print job, such band remaining unprinted, the second portion being located between the first portion and the band. In some examples, the printing of the second portion directly follows the printing of the first portion. In some examples, the second portion comprises a section adjacent to the first portion, whereby the section of the second portion corresponds to a part of the alternative firing data identical to the corresponding preliminary firing data which was not used for firing. The band remaining unprinted should be understood as an elongated area or strip. In some examples, the band is elongated along a direction at a non zero angle to the media path, such angle corresponding to the direction along which the width of the media is considered. In some example, the band is elongated along a direction substantially perpendicular to the media path. In examples of printing a rectangular image aligned with the media path, the band and the second portion should be understood as being separated by a straight line perpendicular to the media path and corresponding to a clean end of print.

The alternative firing data may be obtained in a number of different manner. In some examples, the preliminary firing data comprises preliminary print zone data, preliminary column pulses and preliminary image data, whereby the alternative firing data comprises alternative print zone data, alternative column pulses and alternative image data. Print zone data should be understood as representing a signal which either enables or disables printing at a printhead die level. Column pulses should be understood as a signal permitting synchronizing printing with media advance. Image data should be understood as representing signals triggering firing at a nozzle level in line with the graphical representation desired. In order to fire a nozzle based on image data, the print zone data should be set, for the respective die, to enabling printing, and the column pulses should reflect a corresponding media advance.

Figure 1B:
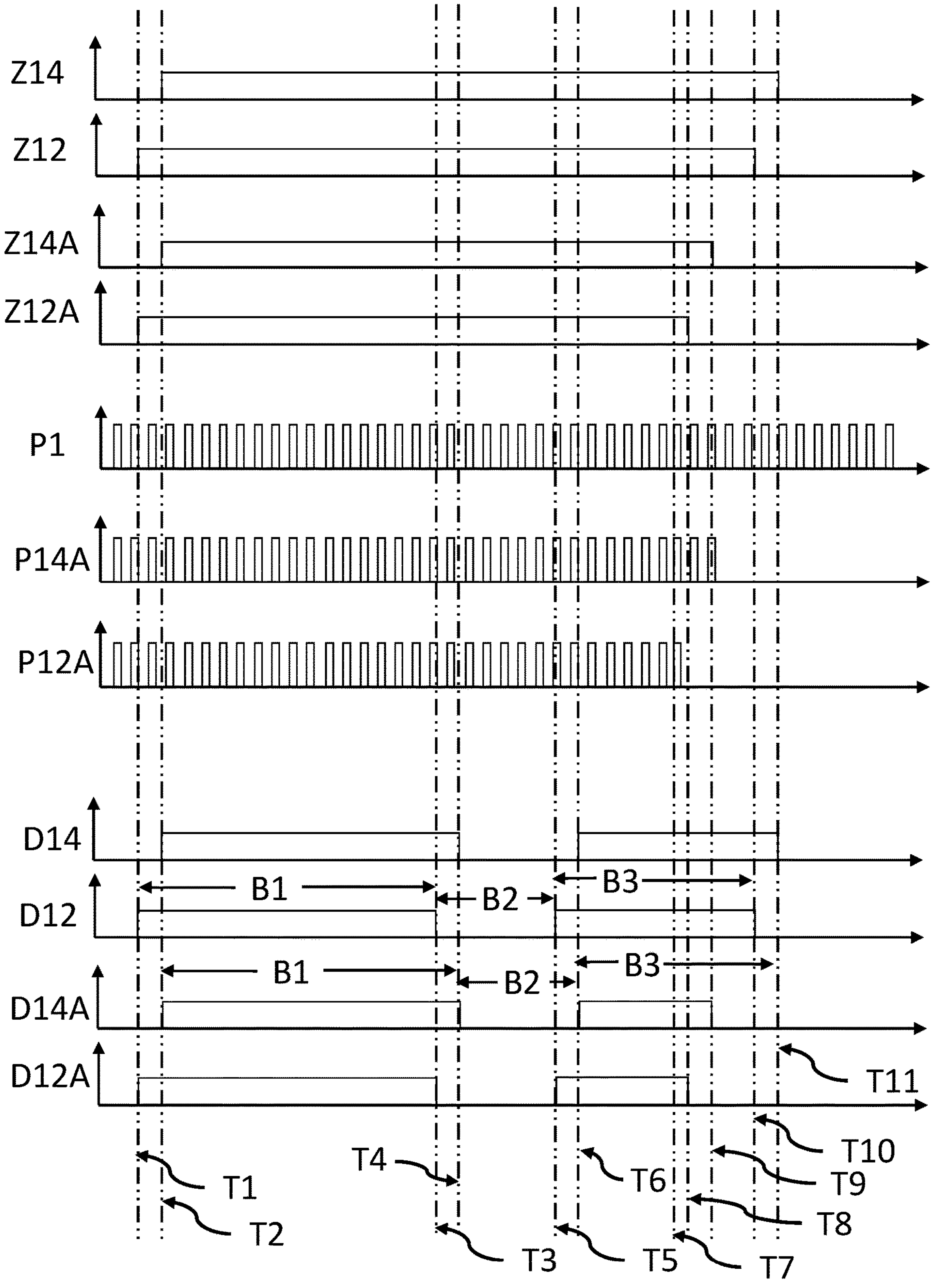
FIG. 1B illustrates example firing data.

FIG. 1B represents different possible manners to obtain alternative data through illustration of different data signals over time.

In an example represented in FIG. 1B, printhead die 112 of printer 100 is submitted to preliminary firing data corresponding to preliminary print zone data Z12, preliminary column pulse data P1 and preliminary image data D12. the image data is not represented at the nozzle level for reasons of clarity. In this example, the complete print job may be a one color motive comprising a band B1 in color, a colorless band B2, and another band B3 in color. As illustrated, for printhead die 112, the preliminary column pulse P1 represents a constant media advance, preliminary print zone data Z12 remains "on" (positive value, printing enabled), and image data remains "on" (positive value, nozzle firing enabled) between times T1 and T3, and between times T5 and T10. In this same example, printhead die 114 of printer 100 is submitted to preliminary firing data corresponding to preliminary print zone data Z14, preliminary column pulse data P1 (common to the preliminary column pulse data for printhead die 112 in this example) and preliminary image data D14. As illustrated, the preliminary print zone data and preliminary image data take into account the offset of the printhead die 114 along the media path, such offset being reflected by the difference in time between T1 and T2, between T3 and T4, between T5 and T6, and finally between T10 and T11. In other words, due to printhead die 114 being located downstream from printhead die 112, printhead die 112 will start firing at time T1 prior to printhead die 114 starting firing at time T2. Printhead die 112 would stop firing at time T10 prior to printhead die 114 stopping firing at time T11. In this example, assuming that an interruption request is received at time T7 following time T6, the alternative firing data may be obtained by modifying the preliminary print zone data Z12 and Z14 to obtain alternative print zone data Z12A and Z14A respectively, whereby the time difference between T8 and T9 is calculated to reflect the offset between printhead dies and thereby permit a clean interrupted print end. In this example, the alternative column pulses correspond to the preliminary column pulses, both corresponding to a same media advance speed along the media path. In this example, the alternative image data may correspond to the preliminary image data. In this example, the alternative firing data is obtained by modifying the print zone data exclusively.

In another example represented in FIG. 1B, and starting from the same preliminary firing data represented by Z14, Z12, P1, D14 and D12 as explained above, the alternative firing data corresponding to an interruption received at time T7 may be obtained by modifying the column pulse data, shutting down the column pulse data at point T8 for printhead die 112 as illustrated in P12A and shutting down the column pulse data at point T9 for printhead die 114 as illustrated in P14A. The alternative firing data in this example is obtained by exclusively modifying the column pulse data for the different printhead dies, the remaining alternative firing data remaining unchanged from the preliminary firing data. In this example, the printhead dies will stop firing when the respective column pulses data signals will be shut down. This example however requires the possibility for the column pulses to be printhead die specific.

In another example represented in FIG. 1B, and starting from the same preliminary firing data represented by Z14, Z12, P1, D14 and D12 as explained above, the alternative firing data corresponding to an interruption received at time T7 may be obtained by modifying the image data, shutting down the printing of the image data at point T8 for printhead die 112 as illustrated in D12A and shutting down the image data at point T9 for printhead die 114 as illustrated in D14A. The alternative firing data in this example is obtained by exclusively modifying the image data for the different printhead dies, the remaining alternative firing data remaining unchanged from the preliminary firing data. In this example, the printhead dies will stop firing when the respective image data signals will be shut down.

Figure 2:
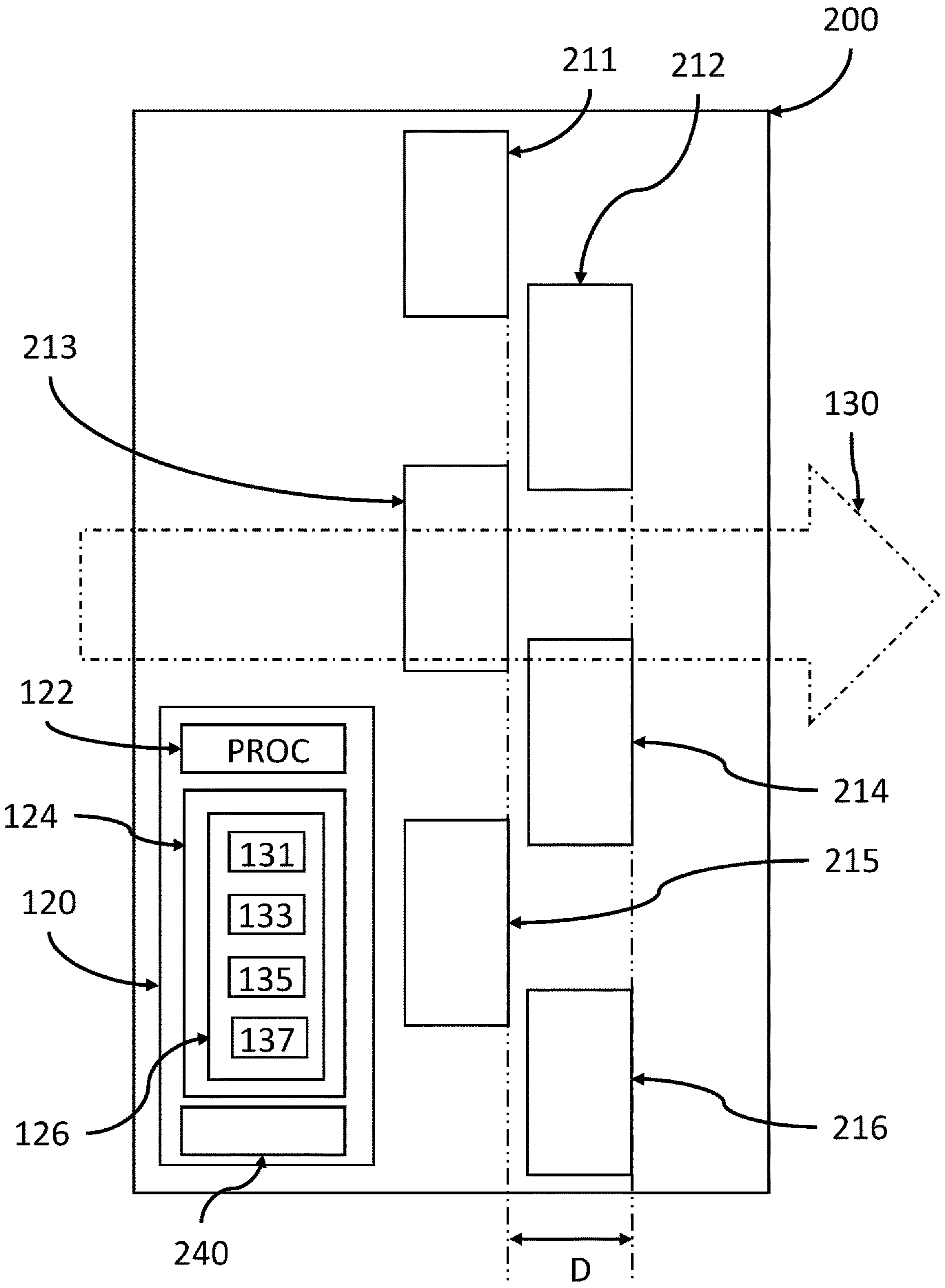
FIG. 2 illustrates another example printer.

FIG. 2 illustrates another example page wide array printer 200. Printer 200 comprises some components such as the controller 120 corresponding to components of printer 100, such components being labeled using the same reference numerals. Printer 200 comprises a monitoring module 240. Monitoring module may be part of controller 120 or may be implemented as a module external to controller 120. Monitoring module 240 may be implemented as electronical hardware, by software, or by a combination of both hardware and software. Monitoring module 240 is monitoring one of a media jam, a media dimension, a waste container level, a remaining printing fluid quantity or a remaining media quantity. In some examples, monitoring module 240 is connected to a sensor comprised in the printer or to sensors comprised in the printer permitting to monitor a media jam, a media dimension, a waste container level, a remaining printing fluid quantity or a remaining media quantity. Such monitored events or quantities are in this example monitored due to being susceptible to trigger a printing interruption. The monitoring may apply to one, to some or to all of a media jam, a media dimension, a waste container level, a remaining printing fluid quantity or a remaining media quantity.

Printer 200 further comprises printhead dies, in this example six printhead dies 211-216, which are staggered along two parallel straight lines separated by a distance D along the media path, the distance corresponding to the offset. Such a configuration permits using printhead dies having relatively reduced dimensions, and thereby relatively easier to manufacture, while obtaining a page wide array printer structure. In such a configuration, proceeding with instructions such as instructions 131-137 permits avoiding an interrupted end of print which would otherwise be crenelated in line with the staggered printhead dies configuration.

Figure 3:
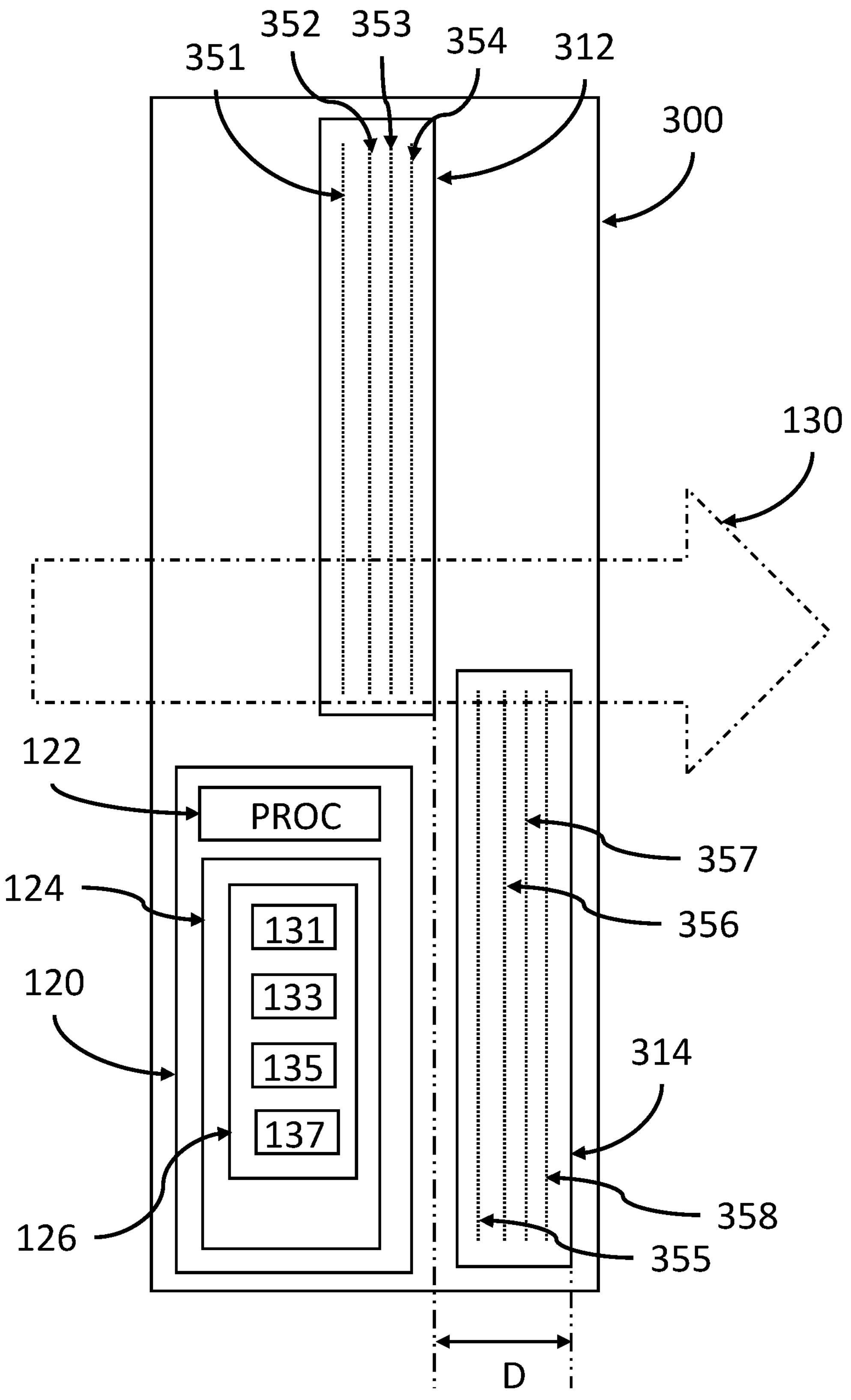
FIG. 3 illustrates a further example printer.

FIG. 3 illustrates another example page wide array printer 300. Printer 300 comprises some components such as the controller 120 corresponding to components of printer 100, such components being labeled using the same reference numerals. Printer 300 comprises printhead dies 312 and 314, whereby each printhead die comprises a plurality of nozzle trenches 351-358, each trench being located along a direction perpendicular to a media path direction 130, each nozzle trench being associated to a specific printing fluid, whereby the alternative image data of each trench is set to no-firing as each trench enters the band of the complete print job remaining unprinted. In this example, each printhead die 312 and 314 comprises four trenches corresponding to printing fluid colors CMYK (Cyan, Magenta, Yellow, blacK). In this example, trenches 351 and 355 are comprised of black printing fluid nozzles, trenches 352 and 356 of yellow printing fluid nozzles, trenches 353 and 357 of magenta printing fluid nozzles and trenches 354 and 358 of cyan printing fluid nozzles. Setting the alternative image data of each trench to no-firing as each trench enters the band of the complete print job remaining unprinted permits obtaining a clean end of interrupted print job at the trench level, in a manner similar to the manner explained at the printed head level in FIG. 1B. When operating at a trench level, the alternative image data may be obtained by modification of a signal taken into account at the trench or nozzle level. In case of use of print zone data, column pulses and image data as explained in the context of FIG. 1B, an action on print zone data would not have an impact at the trench level (because the print zone data is taken into account at the printhead die level, and would not permit operating at the trench level). A modification of image data would however be suitable in such a specific case.

Figure 4:
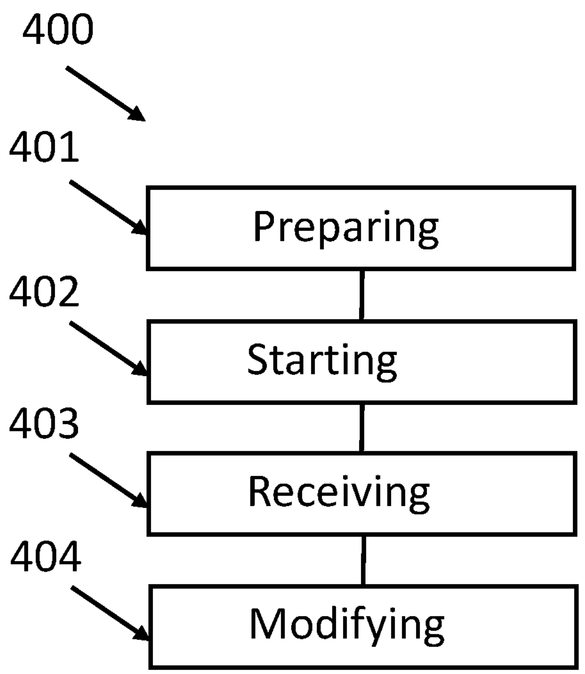
FIG. 4 illustrates an example method.

FIG. 4 illustrates an example method 400 to operate a page wide array printer as per any of the examples hereby described. Example method 400 comprises block 401 of preparing nominal firing data of a print job for a first printhead die and for a second printhead die of a page wide array printer, whereby the first printhead die is located downstream from the second printhead die along a media path of the printer, the first printhead die and the second printhead die being offset along the media path by an offset distance. The nominal firing data should be understood as firing data prepared for printing a complete, uninterrupted print job. The nominal firing data is preliminary firing data in the sense that such firing data will ultimately be modified following the print job interruption. In some examples, such prepared nominal firing data is loaded as per instructions 131 on storage of a printer controller as preliminary firing data. Example method 400 comprises block 402 of starting printing of the print job by applying the nominal firing data to the first and to the second printhead dies. In some examples, in particular when more than two printhead dies are present, one may start printing of the print job by applying the nominal firing data to the more than two printhead dies, sometime to all printhead dies. Such block 402 can lead to obtaining the first portion of the complete print job as a result of a printer controller following instructions as per instructions 133 described hereby. Example method 400 comprises, in block 403, receiving a print job interruption request during printing of the print job. Such interruption request may originate from different sources. In some examples, the print job interruption request is triggered by a user of the page wide array printer, for a variety of different reasons, for example due to the user noticing that insufficient consumable (printing fluid or printing media) is available to complete the print job, or due to the a user assessing that the graphical representation remaining unprinted is, for some reason, unnecessary. A user of the printer may trigger the interruption for example by pressing an interruption button. In some examples, the print job interruption request is triggered by a monitoring module of the page wide array printer, for example by a module such as module 240. Example method 400 further comprises, in block 404, in response to receiving the job interruption request, modifying the nominal firing data to obtain modified firing data for interrupting printing using the first printhead die while continuing printing using the second printhead die during a specific time period after the first printhead die interrupted the printing, the specific time corresponding to the offset distance. The modified firing data is modified to obtain alternative firing data as loaded in a printer controller storage, for example as per instructions 135, and to set a printer to print a second portion of the complete print job as hereby described. The time during which the second printhead die continues printing after the first printhead die interrupted or stopped printing, or ejecting printing fluid, corresponds to printing at least part of the second portion of the complete print job.

One should note that in a number of examples hereby described, the modification of firing data in response to receiving the interruption may take some time, such time being for example associated to the computing of such modification, such time slightly delaying the actual interruption. In some examples, a time period separating the reception of the print job interruption request and the completion of the modifying of the nominal firing data to obtain modified firing data for interrupting printing in response to the reception of the print job interruption request is a time period of at least 0.1 s, at least 0.5 s, at least 2 s or at least 3 s. In some examples, such time period is of less than 10 s, less than 7 s or less than 5 s. Such time period ranges permits can both permit obtaining the modified data as hereby disclosed and effectively interrupting the printing relatively quickly as requested In some examples, method 400 may be used when the printing takes place on a cut sheet of media. A cut sheet of media should be understood as a sheet of media cut by a user or operator from a larger sheet or media, or from a media roll, prior to being loaded into the printer for printing. Such cut sheet of media are for example used in commercial printing locations, for example in order to minimize media waste. In some examples, use of such cut sheet of media may render the printing of the complete print job difficult, for example due to margin requirements. In such situation, in particular if the portion of print job missing from the complete print job due to an interruption is minimal, the present disclosure permits maintaining a clean job end and avoiding for example a crenelated job end which would lead to wasting the interrupted print job altogether.

As illustrated for example in FIGS. 1A, 2 and 3, an example printer may comprise a non transitory machine-readable storage medium such as, for example, storage 124, encoded with instructions such as, for example, instructions 131-137 executable by a processor such as, for example, processor 122. Executing such instructions can permit operating a printer as hereby described according to a method such as example method 400. In some examples, a machine-readable storage medium such as storage 124 comprises instructions to prepare firing data of a print job for staggered printhead dies of a page wide array printer, whereby the staggered printhead die comprise a printhead die located downstream from another printhead die along a media path of the printer. In some examples, such printhead dies are staggered along two parallel straight lines such as printhead dies 211-216. An example machine-readable storage medium such as storage 124 may further comprise instructions to start printing a print job by applying nominal firing data to the printhead dies, the nominal firing data ending at a print job end straight line, such print job end straight line corresponding to a straight line which would correspond to completing the complete print job if it were not interrupted. In some examples, the print job end straight line would be perpendicular to the media path. An example machine-readable storage medium such as storage 124 may further comprise instructions to interrupt printing of the print job by applying modified firing data to the printhead dies, the modified firing data ending at a print job interruption straight line located upstream from the print job end straight line along the media path of the printer. In some examples, the print job interruption straight line is perpendicular to the media path. In some examples the print job end straight line and the print job interruption straight line are parallel to each other (taking into account that the print job end straight line is virtual, while the print job interruption straight line is real). Obtaining such a print job interruption straight line permits obtaining a clean interrupted print job end.

In some examples, nominal firing data such as prepared by instructions comprised in a non-transitory machine-readable storage medium such as, for example, storage 124, comprises nominal print zone data, nominal column pulses and nominal image data, whereby the modified firing data comprises modified print zone data, the nominal column pulses and modified image data as illustrated for example in examples relying on data illustrated by signals P1, Z14A, Z12A, D14A and D12A of FIG. 1B. Maintaining the column pulses unchanged between the nominal and modified firing data reflects that a media advance would be maintained unchanged whether the interruption takes place or not. Modifying the print zone data and image data can permit taking into account printhead die offset, and relative positioning of nozzle trenches within a given printhead die, respectively. In fact, in some examples, each printhead die comprises a plurality of nozzle trenches, each trench being located along a direction perpendicular to a media path direction, each nozzle trench being associated to a specific printing fluid, whereby the modified image data of each trench is set to no firing as the trench passes the print job interruption straight line, thereby permitting obtaining a clean interrupted job end. In some examples, the modified print zone data differs from the nominal print zone data, whereby the difference between the modified print zone data and the nominal print zone data corresponds to a distance separating the print job interruption straight line from the print job end straight line, such distance reflecting for example an offset between the printhead dies along the media path.

In some examples, the print job processed by instructions comprised in a non-transitory machine-readable storage medium such as, for example, storage 124, is a nested print job. A nested print job should be understood as a print job comprising a plurality of sub-print jobs, whereby such sub-print jobs are arranged to fit on a given printing area in a manner which permits reducing printing media waste. Such sub-print jobs may be packed into a larger, nested print job as hereby described. In such examples, in cases of interruptions as hereby disclosed, one of such sub-print jobs may be completed as another of such sub-print jobs remains incomplete. In some examples, instructions as hereby described permit avoiding or reducing a risk that some of the sub-print job be affected by a default such as crenelation.

What is claimed is:

1. A page wide array printer comprising printhead dies and a controller, some of the printhead dies being offset along a media path by an offset distance, the controller comprising a processor, a storage coupled to the processor, and an instruction set to cooperate with the processor and the storage to:

load preliminary firing data for printing a print job;

print a first portion of the print job by firing each of the printhead dies using the preliminary firing data;

load alternative firing data during the printing of the first portion after an interruption, wherein the alternative firing data excludes a band of data at an end of the preliminary firing data; and print a second portion after the first portion and after the interruption by firing each of the printhead dies using the alternative firing data, wherein the printed first portion and the printed second portion contain less data than the preliminary firing data, wherein the printed first portion and the printed second portion does not print the band of data at the end of the preliminary firing data.

2. The printer according to claim 1, wherein the controller comprises a monitoring module monitoring one of a media jam, a media dimension, a waste container level, a remaining printing fluid quantity or a remaining media quantity.

3. The printer according to claim 1, wherein the printhead dies are staggered along two parallel straight lines separated by a distance along the media path, the distance corresponding to the offset.

4. The printer according to claim 1, wherein the preliminary firing data comprises preliminary print zone data, preliminary column pulses and preliminary image data, and wherein the alternative firing data comprises alternative print zone data, alternative column pulses and alternative image data.

5. The printer according to claim 4, wherein the alternative column pulses correspond to the preliminary column pulses, both corresponding to a media advance speed along the media path.

6. The printer according to claim 4, wherein each printhead die comprises a plurality of nozzle trenches, each trench being located along a direction perpendicular to a media path direction, each nozzle trench being associated to a specific printing fluid, wherein the alternative image data of each trench is set to no-firing as each trench enters the band of the complete print job remaining unprinted.

7. A method comprising:

preparing nominal firing data of a print job for a first printhead die and for a second printhead die of a page wide array printer, wherein the first printhead die is located downstream from the second printhead die along a media path of the printer, the first printhead die and the second printhead die being offset along the media path by an offset distance;

starting printing of a first portion of the print job by applying the nominal firing data to the first printhead die and to the second printhead die;

receiving a print job interruption request during printing of the first portion of the print job; and in response to receiving the print job interruption request, modifying the nominal firing data to obtain modified firing data for interrupting printing using the first printhead die while continuing printing using the second printhead die and printing a second portion after the first portion using the modified firing data using the second printhead die and during a specific time period after the first printhead die interrupted the printing, the specific time corresponding to the offset distance, wherein a combination of the printed first portion and the printed second portion excludes a band of data at an end of the nominal firing data.

8. The method according to claim 7, wherein the print job interruption request is triggered by a user of the page wide array printer.

9. The method according to claim 7, wherein the print job interruption request is triggered by a monitoring module of the page wide array printer.

10. The method according to claim 7, wherein the printing takes place on a cut sheet of media.

11. A non transitory machine-readable storage medium encoded with instructions executable by a processor, the machine-readable storage medium comprising:

instructions to prepare firing data of a print job for staggered printhead dies of a page wide array printer, wherein each of the staggered printhead dies comprise a printhead die located downstream from another printhead die along a media path of the page wide array printer;

instructions to start printing a first portion of a print job by applying nominal firing data to each of the staggered printhead dies, the nominal firing data ending at a print job end straight line;

instructions to interrupt printing of the first portion of the print job by applying modified firing data to each of the printhead dies and printing a second portion after the first portion using the modified firing data by the printhead dies, the modified firing data ending at a print job interruption straight line located upstream from the print job end straight line along the media path of the printer, wherein a combination of the printed first portion and the printed second portion excludes a band of data at an end of the nominal firing data.

12. The non transitory machine-readable storage medium according to claim 11, wherein the nominal firing data comprises nominal print zone data, nominal column pulses and nominal image data, and wherein the modified firing data comprises modified print zone data, the nominal column pulses and modified image data.

13. The non transitory machine-readable storage medium according to claim 12 wherein each printhead die comprises a plurality of nozzle trenches, each trench being located along a direction perpendicular to a media path direction, each nozzle trench being associated to a specific printing fluid, wherein the modified image data of each trench is set to no firing as the trench passes the print job interruption straight line.

14. The non transitory machine-readable storage medium according to claim 12, wherein the modified print zone data differs from the nominal print zone data, wherein the difference between the modified print zone data and the nominal print zone data corresponds to a distance separating the print job interruption straight line from the print job end straight line.

15. The non transitory machine-readable storage medium according to claim 11, wherein the print job is a nested print job.

* * * * *